US012749892B2

(12) United States Patent
Fazzari et al.

(10) Patent No.: US 12,749,892 B2
(45) Date of Patent: Sep. 29, 2026

(54) ASYNCHRONOUS DISTRIBUTED CONTROL DESIGN USING TIERED AUTOMATION ALGORITHMS

(71) Applicant: Schweitzer Engineering Laboratories, Inc., Pullman, WA (US)

(72) Inventors: Bryan J. Fazzari, Meridian, ID (US); Brent L. DeSpain, Meridian, ID (US); Brittany D. Nall, Boise, ID (US); Mike Jones, Meridian, ID (US); Thomas J. Tardigrade, Kuna, ID (US); Joe Stanley, Potlatch, ID (US); Conner W. Maxey, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 676 days.

(21) Appl. No.: 18/153,639

(22) Filed: Jan. 12, 2023

(65) Prior Publication Data

US 2024/0243573 A1 Jul. 18, 2024

(51) Int. Cl.

| | |
|---|---|
| ***H02J 3/0012*** | (2026.01) |
| ***G05B 19/042*** | (2006.01) |
| ***H02J 3/14*** | (2026.01) |
| ***H02J 3/38*** | (2026.01) |

(52) U.S. Cl.

CPC .......... *H02J 3/0012* (2020.01); *G05B 19/042* (2013.01); *H02J 3/14* (2013.01); *H02J 3/381* (2013.01); *G05B 2219/2639* (2013.01)

(58) Field of Classification Search

CPC . H02J 3/0012; H02J 3/14; H02J 3/381; G05B 19/042; G05B 2219/2639

See application file for complete search history.

(56) References Cited

U.S. PATENT DOCUMENTS

| | | | |
|---|---|---|---|
| 4,454,556 | A | 6/1984 | Depuy |
| 5,097,380 | A | 3/1992 | Moran |
| 5,237,511 | A | 8/1993 | Caird |
| 5,303,112 | A | 4/1994 | Zulaski |
| 5,373,411 | A | 12/1994 | Grass |
| 5,513,061 | A | 4/1996 | Gelbien |
| 5,629,825 | A | 5/1997 | Wallis |
| 5,896,302 | A | 4/1999 | Goodpaster |
| 5,973,899 | A | 10/1999 | Williams |
| 6,005,759 | A | 12/1999 | Hart |
| 6,008,971 | A | 12/1999 | Duba |
| 6,212,049 | B1 | 4/2001 | Spencer |
| 6,239,960 | B1 | 5/2001 | Martin |
| 6,341,054 | B1 | 1/2002 | Walder |
| 6,459,998 | B1 | 10/2002 | Hoffman |

(Continued)

*Primary Examiner* — Charles Cai

(74) *Attorney, Agent, or Firm* — Fletcher Yoder, P.C.

(57) ABSTRACT

A distributed control system based on numerous models of small-scale subsystems within power delivery and/or distribution systems may increase the performance of solvers, automation algorithms, and control systems. By implementing multiple discrete control system models and effectuating simple communications (e.g., requests and responses for additional electric power) between the multiple discrete control system models, the processing power and time associated with modeling the power system and responding to events occurring within the power system may be reduced, and greater flexibility and modularity may be provided to the power delivery and distribution systems.

20 Claims, 8 Drawing Sheets

(56) References Cited

U.S. PATENT DOCUMENTS

| | | | | |
|---|---|---|---|---|
| 6,549,880 | B1 | 4/2003 | Willoughby | |
| 7,414,819 | B2 | 8/2008 | Lee | |
| 7,714,735 | B2 | 5/2010 | Rockwell | |
| 7,725,295 | B2 | 5/2010 | Stoupis | |
| 8,067,946 | B2 | 11/2011 | Muench | |
| 8,526,156 | B2 | 9/2013 | Schweitzer | |
| 8,665,102 | B2 | 3/2014 | Salewske | |
| 9,257,833 | B2 | 2/2016 | Allen | |
| 2006/0039094 | A1 | 2/2006 | Brucker | |
| 2010/0036538 | A1 | 2/2010 | Stergiou | |
| 2011/0080044 | A1* | 4/2011 | Schmiegel | H02J 3/381<br>307/38 |
| 2013/0085624 | A1* | 4/2013 | Yang | H02J 3/144<br>700/297 |
| 2013/0163132 | A1 | 6/2013 | Schweitzer | |
| 2014/0277804 | A1 | 9/2014 | Witte | |
| 2019/0278242 | A1* | 9/2019 | Gervais | G06N 3/006 |
| 2020/0274523 | A1* | 8/2020 | Halladay | G06F 17/18 |
| 2022/0080852 | A1* | 3/2022 | Yu | H02J 7/00034 |
| 2023/0068247 | A1* | 3/2023 | Wang | B60L 53/63 |

* cited by examiner

ASYNCHRONOUS DISTRIBUTED CONTROL DESIGN USING TIERED AUTOMATION ALGORITHMS

BACKGROUND

This disclosure relates to electric power delivery systems. More particularly, this disclosure relates to control systems of an electric power delivery system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery or distribution systems carry electricity from a transmission system to residential communities, factories, industrial areas, and other electricity consumers. Control systems for such systems may include creating a centralized model of the electric power delivery and distribution systems. Algorithms (e.g., fault location isolation and service restoration (FLISR) algorithms) may be trained on such large-scale centralized models to assist in locating and addressing permanent electrical faults. However, the size and complexity of some electric power delivery and distribution system models may consume excessive, and sometimes prohibitive, amounts of processing power and time. Such models may be rigid and less responsive to changes in the power delivery and distribution systems.

DETAILED DESCRIPTION

Figure 1:
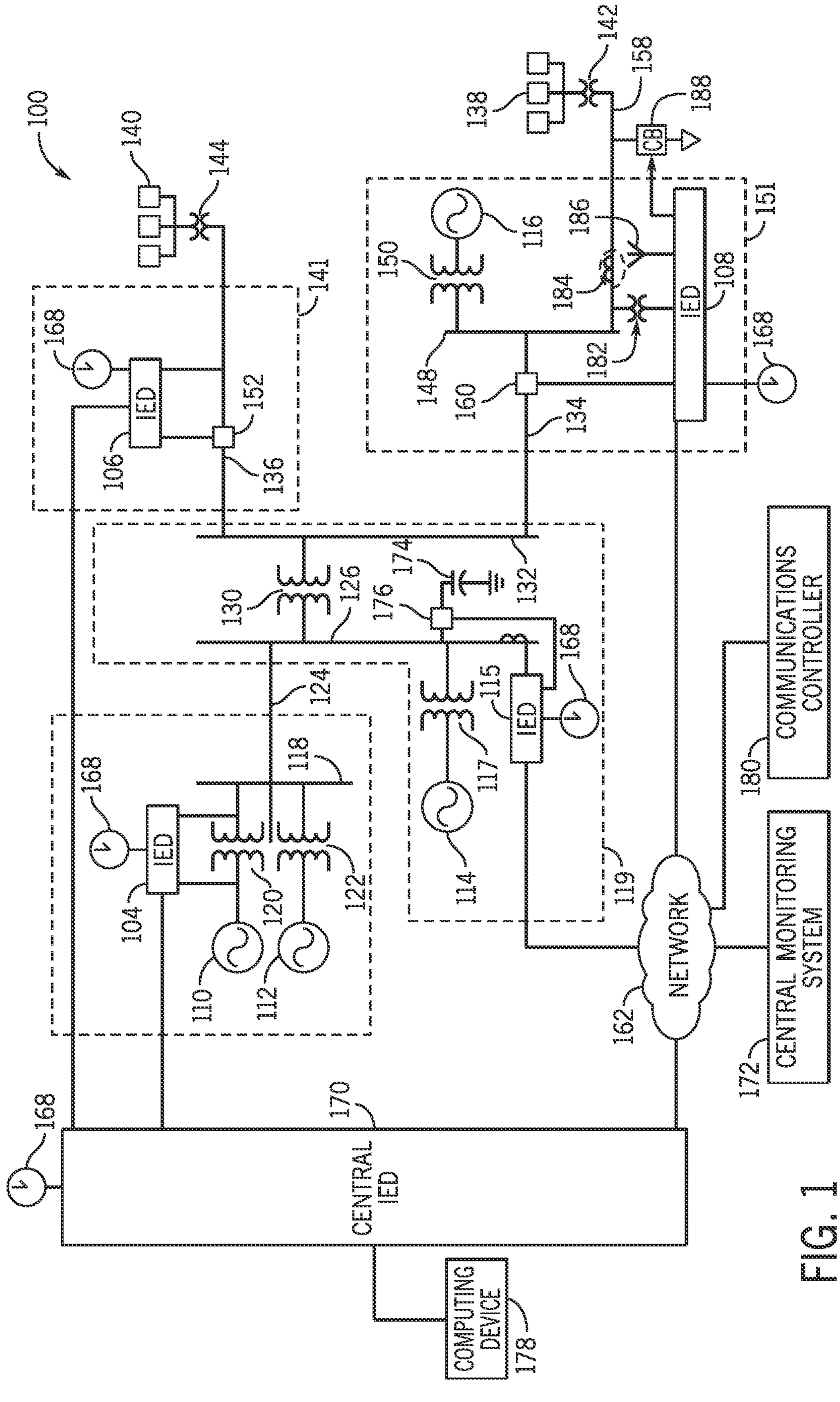
FIG. 1 is a schematic diagram of an embodiment of an electric power delivery system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In some electric power control systems, electric power generation, transmission, sub-transmission, and distribution systems may be represented as monolithic, centralized power models, with all systems, subsystems, and settings represented as one model. Such models may involve significant computing power and costs, making it difficult or impossible to distribute to low-power computing platforms with limited resources. Moreover, the centralized power models may include significant complexity, may be rigid, and may entail stringent maintenance—a change in one part of the centralized power model may substantially affect numerous components across the centralized power model.

If, for example, an artificial intelligence engine (e.g., a machine learning engine) is trained on the centralized power model, the vast complexity of the model may result in significantly increased training time and decreased reliability of the machine learning engine. Further, if changes are made to the centralized power models, the machine learning engine may require retraining on the entire system, which may incur significant cost and time for each change made to the power system. For example, with the rise of distributed energy resources (DERs), power generators may be quickly and easily added to a grid system (e.g., a distribution system) where historically power only originated at a power generator connected to the transmission system. The centralized power model may include significant processing power and time to retrain the AI engine on the model each time a new DER asset is inserted into the system and/or taken offline. Additionally, in conventional centralized power models, if a fault occurs in the system the DER asset may be required to electrically isolate itself (i.e., pull itself offline) until the fault is resolved, removing a potentially valuable power source during a fault.

In some embodiments, a distributed electric power control system model may alleviate the time and complexity involved in modeling and testing the control system model while providing greater flexibility and modularity. The distributed control system model may include small-scale models of subsystems in the power system. For example, while a centralized power model may include an entire electric power supply system from generation to distribution, or an entire transmission/sub-transmission system, multiple distributed power models may each include a discrete model of a control system for single circuit that may deliver power from a power source to a distribution substation. By modeling only a portion of the power system, fewer inputs and variables may be associated with the model, and an AI engine may be more quickly and easily trained with greater reliability. In some embodiments, solvers or automation algorithms may be used instead of AI or ML engines. The solvers or automation algorithms may be simpler, may use less processing power to execute, and may be faster and more responsive as they may not require training like an AI or ML engine. As mentioned, using distributed power models may enable greater flexibility in the overall power model. For example, if a power source (e.g., a DER asset) is added to a first circuit of the power system, the change may affect only the models of circuits adjacent to the first portion, or may not affect other circuits at all.

The distributed power models may be scalable. As discussed above, in some embodiments the distributed power models may include a discrete model of a single circuit in a transmission/sub-transmission system (e.g., a circuit that delivers power from an electric power generator to a distribution substation). In other embodiments, the distributed power models may include a larger scale model that models a single circuit or multiple adjacent circuits that carry power from the power source to a customer. In still other embodiments, the distributed power models may include a single circuit that carries power from a distribution substation to one or more customers.

With the preceding in mind, FIG. 1 is a schematic diagram of an electric power delivery system 100 that may generate, transmit, and/or distribute electric energy to various loads (e.g., different structures). The electric power delivery system 100 may use various intelligent electronic devices (IEDs) 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor bank (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A central IED 170 (e.g., a switch) may be in communication with the IEDs 104, 106, 108, 115. The IEDs 104, 106, 108, 115 may be remote from the central IED 170 and may communicate over various media. For instance, the central IED 170 may be directly in communication with the IEDs 104, 106 and may be in communication with the IEDs 108, 115 via the communications network 162. In some cases, the central IED 170 may be a regional IED implemented at a substation.

The central IED 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the central IED 170. The central IED 170 may receive the data and may subsequently transmit the data to an intended recipient of the data. The central IED 170 may also control data flow between one of the IEDs 104, 106, 108, 115 and another device communicatively coupled to the central IED 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the central IED 170 and/or to send data, such as a user input, to the electric power delivery system 100 via the central IED 170. Thus, the central IED 170 may enable or block operation of the electric power delivery system 100 via the computing device 178.

A communications controller 180 may interface with equipment in the communications network 162 to create a software-defined network that facilitates communication between the central IED 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the central IED 170 to instruct the central IED 170 to transmit certain data (e.g., data associated with a certain set of characteristics or information) to a particular destination (e.g., an intended recipient) using flows, matches, and actions defined by the communications controller 180.

Figure 2:
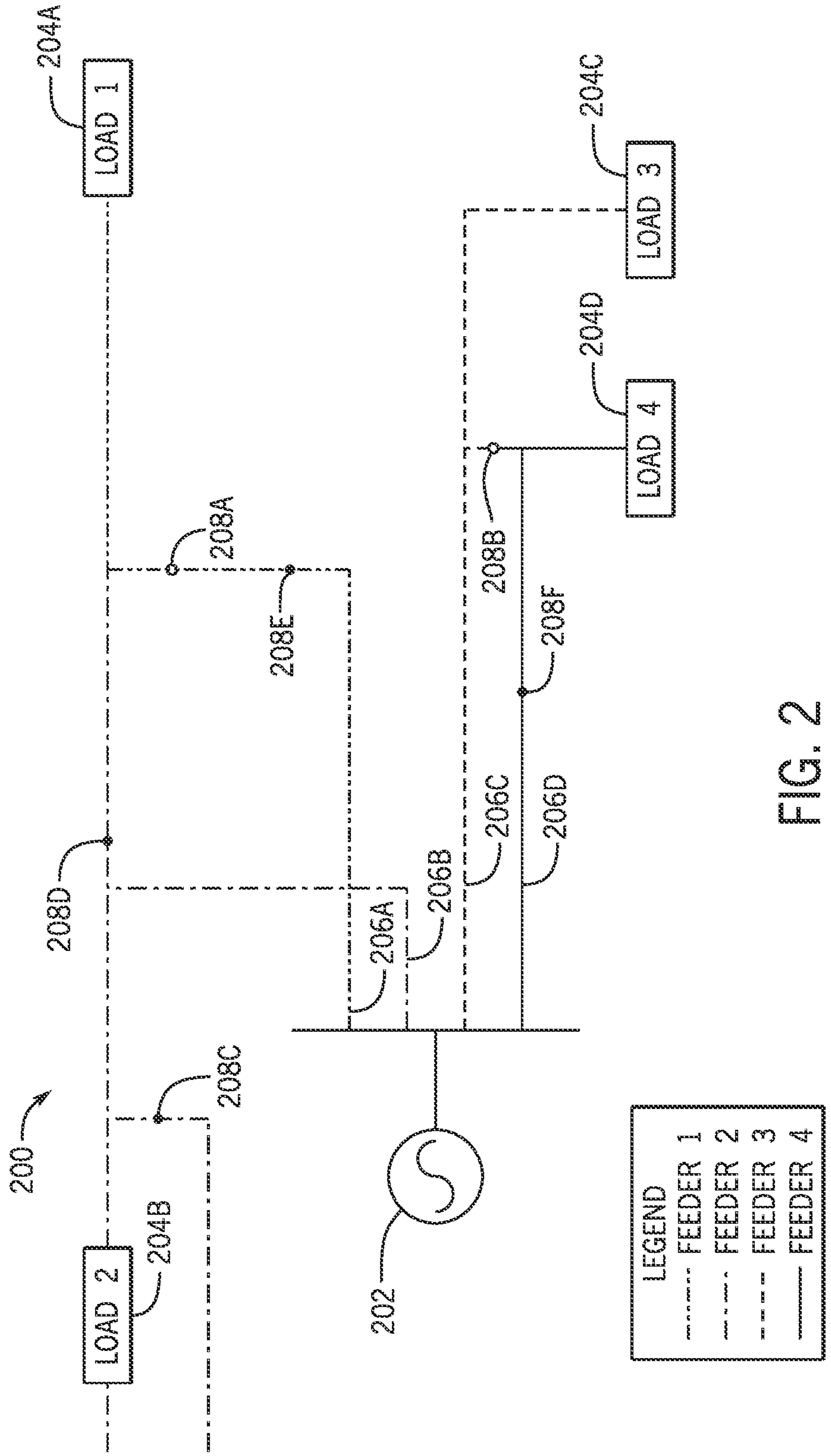
FIG. 2 is a schematic diagram of a subsystem of the electric power delivery system of FIG. 1 including various feeder circuits, in accordance with an aspect of the present disclosure.

FIG. 2 is a schematic diagram of a subsystem 200, where the subsystem 200 may include a portion of a power delivery system (e.g., 100). The subsystem 200 may include an electric generator 202 which may supply multiple electrical loads 204A, 204B, 204C and 204D (collectively referred to herein as the electrical loads 204) via multiple feeder circuits 206A, 206B, 206C, and 206D (collectively referred to herein as the feeder circuits 206). The electrical loads 204 may include any area or structure that receives electrical power (e.g., residential homes, businesses). The feeder circuits 206 may include various switches 208A, 208B, 208C, 208D, 208E, and 208F (collectively referred to herein as the switches 208). The switches 208 may include any of the various relays discussed above as well as circuit breakers, reclosers, and so on. In the subsystem 200, the switches 208A and 208B may be open switches (e.g., represented by a white circle) and the switches 208C, 208D, 208E and 208F may be closed switches (e.g., represented by a black circle).

The feeder circuits 206 may meet at certain junctures in the subsystem 200, such as at the switches 208A and 208B. But while the switches 208A and 208B are open, the feeder circuits may be electrically separate from each other (e.g., such that the feeder circuit 206A does not give power to or receive power from the feeder circuit 206B). However, via control system equipment (e.g., the IEDs discussed in FIG. 1) the switches 208A and 208B may be closed to electrically join multiple feeders. This may be desirable in the case of a fault occurring on one or more of the feeder circuits 206. As will be discussed in greater detail below, in the event of a fault occurring in the subsystem 200, it may be advantageous to electrically isolate and de-energize a feeder circuit 206 or a portion of the feeder circuit 206 on which there is fault. An automated control system may (e.g., via one or more solvers or automation algorithms operating on one or more IEDs) automatically identify a location of the fault and may open certain switches 208 to isolate the fault and close certain switches 208 to join two or more feeder circuits 206 and reroute power to mitigate the effects of the fault.

Figure 3:
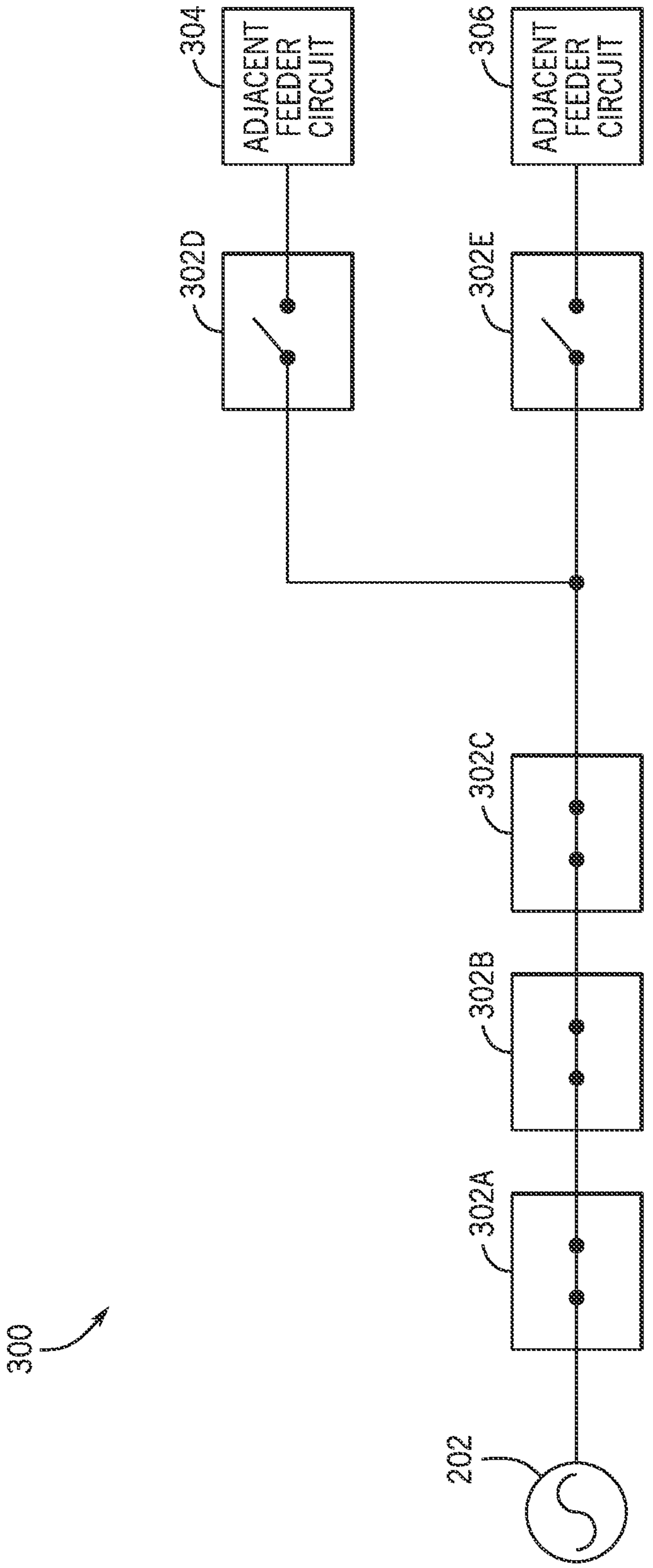
FIG. 3 is a schematic diagram of a feeder circuit during a normal (e.g., non-fault) state, in accordance with an aspect of the present disclosure.

FIG. 3 is a schematic diagram of a feeder circuit 300 during a normal (e.g., non-fault) state. A solver may operate on the feeder circuit 300, enabling the solver to detect faults at the feeder circuit 300 and close or open switches to isolate and/or reroute power to the feeder circuit 300. The feeder circuit may include multiple switches 302A, 302B, 302C, 302D, and 302E (collectively referred to herein as the switches 302). As previously discussed, the switches 302 may include any of the various types of relays described above in FIG. 1 as well as circuit breakers, reclosers, and so on.

The switches 302D and 302E may electrically couple the feeder circuit 300 to adjacent feeder circuits 304 and 306.

The adjacent feeder circuits 304 and 306 may, similarly to the feeder circuit 300, receive electric power from one or more electric generators. The one or more electric generators feeding the adjacent feeder circuits 304 and 306 may be the same as the electric generator 202, may be shared between the adjacent feeder circuits 304 and 306 but different from the electric generator 202, or may include three separate electric generators, such that the feeder circuit 300 and the adjacent feeder circuits 304 and 306 are fed by three unique power sources.

As may be observed, the switches 302D and 302E are open in FIG. 3, thus the feeder circuit 300 is electrically separate from the adjacent feeder circuits 304 and 306. However, in certain events (e.g., a fault on the feeder circuit 300), the feeder circuit 300 may need additional power to supply electrical load(s) coupled to the feeder circuit (e.g., a residential home, and office building). As will be discussed in greater detail below, in such situations, the switches 302D and/or 302E may be closed to electrically couple the feeder circuit 300 to one or more of the adjacent feeder circuits 304 and 306.

Figure 4:
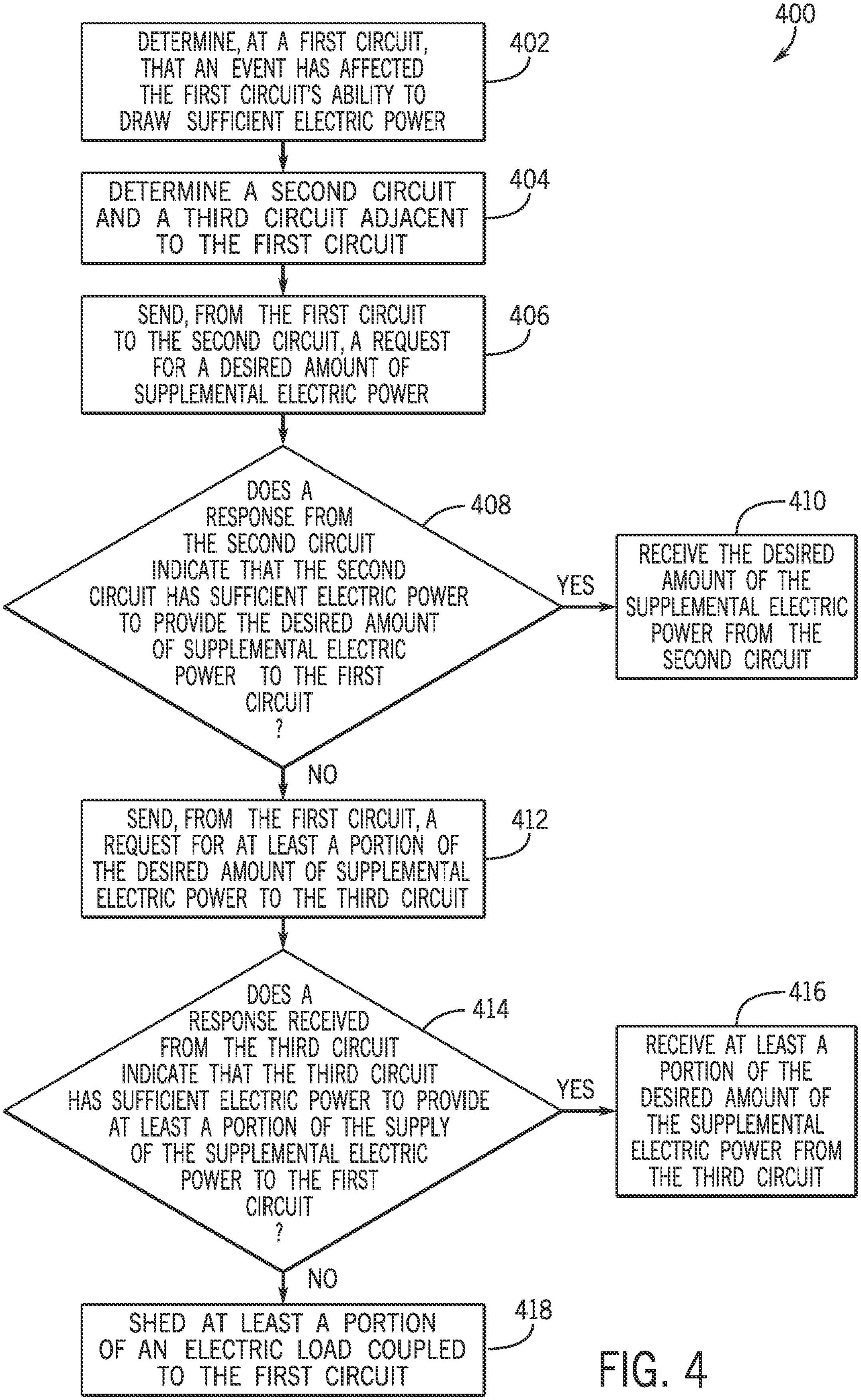
FIG. 4 is a flowchart of a method for detecting a fault at the feeder circuit of FIG. 3 and requesting supplemental electric power from adjacent feeder circuits, in accordance with an aspect of the present disclosure.

FIG. 4 is a flowchart of a method 400 for requesting supplemental electric power from adjacent feeder circuits (e.g., 304 and 306). The method 400 may be performed by a processor of a computing device (e.g., the computing device 178) or an IED associated with a feeder circuit (e.g., 300). More specifically, the method 400 may be performed by a solver, an automation algorithm, or a machine learning engine running on the processor of the computing device 178 or the IED. While the method 400 may be performed by any of the above, the method 400 will be described as being performed by the solver merely for the purpose of simplicity. In process block 402, the feeder circuit 300 determines (e.g., via the solver) that an event has affected the ability of the feeder circuit 300 to draw sufficient electrical power from the electric generator 202. Such events may include a fault occurring at the feeder circuit 300. In process block 404, the feeder circuit 300 determines a second circuit (e.g., the adjacent feeder circuit 304) and a third circuit (e.g., the adjacent feeder circuit 306) adjacent to the feeder circuit 300.

Figure 5:
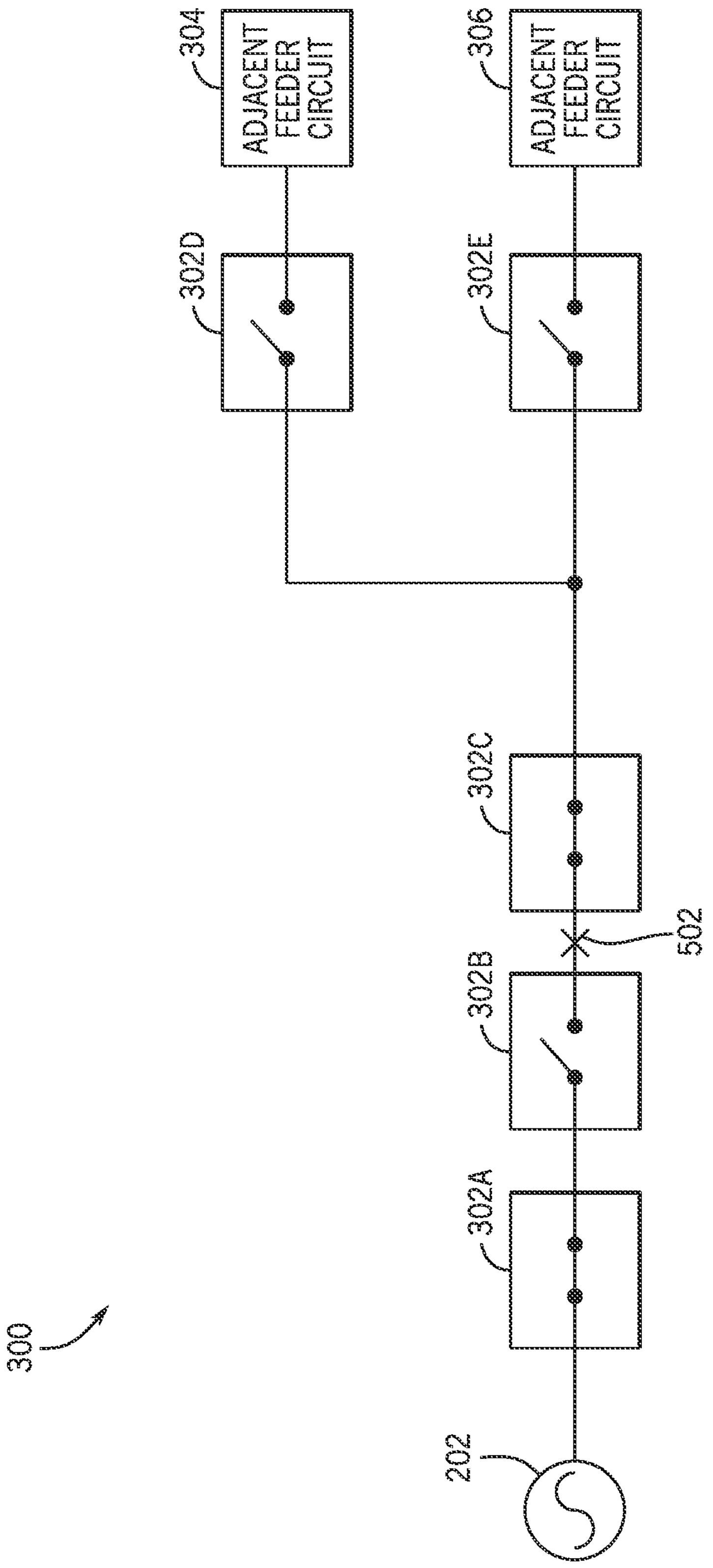
FIG. 5 is a schematic diagram of the feeder circuit of FIG. 3 experiencing a fault, in accordance with an aspect of the present disclosure.

FIG. 5 is a schematic diagram of the feeder circuit 300 experiencing a fault. The feeder circuit may experience a fault 502 causing the switch 302B to open, causing a portion of the feeder circuit 300 to become electrically isolated from the rest of the feeder circuit 300 and the electric power delivery system 100. By electrically isolating a portion of the feeder circuit 300, the feeder circuit 300 may be unable to provide adequate electric power to an electrical load coupled to the feeder circuit 300. Accordingly, the feeder circuit 300 may request supplemental electric power from adjacent feeder circuits (e.g., 304 and 306) or initiate "load shedding"—i.e., cutting off power to one or more electrical loads that may be coupled to the feeder circuit 300. As may be observed, the switches 302D and 302E may close to enable the adjacent feeder circuits 304 and/or 306 to supply all or a portion of the supplemental power needed by the feeder circuit 300. It should be noted that, while only two adjacent feeder circuits are illustrated, there may be any number (e.g., 3 or more, 5 or more, 10 or more, 50 or more, and so on) of feeder circuits adjacent to the feeder circuit 300.

Returning to FIG. 4, in process block 406, the feeder circuit 300 sends a request to an adjacent feeder circuit (e.g., 304) for a desired amount of supplemental electric power. The desired amount of the supplemental electric power may be determined (e.g., by the solver) according to the pre-fault loading on the feeder circuit 300 and/or the real-time or forecasted available margin of the total topology. The feeder circuit 300 may receive, in response to sending the request, a response from the adjacent feeder circuit 304. The response may include an amount of electric power that the adjacent feeder circuit 304 can send to the feeder circuit 300 and still maintain operation (e.g., still supply sufficient electric power to one or more loads electrically coupled to the adjacent feeder circuit 304). It should be noted that, in some embodiments, the request from feeder circuit 300 may not include a particular amount of desire electric power but may include a general request for power, to which the another feeder circuit may respond with an amount of supplemental electric power that may be provided.

In query block 408, the feeder circuit 300 determines whether the response from the adjacent feeder circuit 304 indicates that the adjacent feeder circuit 304 has sufficient electric power to provide to the feeder circuit 300. That is, the feeder circuit 300 determines, based on the response from the adjacent feeder circuit 304, whether the adjacent feeder circuit 304 has sufficient electrical capacity to provide the desired amount of supplemental electric power to the feeder circuit 300. If the feeder circuit 300 determines that the adjacent feeder circuit 304 has sufficient electric power, in process block 410 the switch 302D may close and the feeder circuit 300 receives the desired amount of the supplemental electric power from the adjacent feeder circuit 304. For example, if the feeder circuit 300 requests 20 amps from the adjacent feeder circuit 304 and the adjacent feeder circuit 304 can supply 20 amps without interruption to its own operation, then the feeder circuit 300 may simply receive the 20 amps and avoid load shedding.

However, if, in the query block 408, the feeder circuit 300 determines that the adjacent feeder circuit 304 does not have sufficient electric power to supply the desired amount of supplemental electric power, in process block 412, the feeder circuit 300 sends a request to another adjacent feeder circuit (e.g., 306) requesting at least a portion of the desired amount of supplemental electric power. For example, if the feeder circuit 300 requests 20 amps from the adjacent feeder circuit 304 and the adjacent feeder circuit 304 cannot supply any supplemental electric power or can only supply a portion (e.g., 10 amps), the feeder circuit 300 may send a request for the remainder to the adjacent feeder circuit 306.

In query block 414, the feeder circuit 300 determines whether a response from the adjacent feeder circuit 306 indicates that the adjacent feeder circuit 306 has sufficient electric power to provide to the feeder circuit 300. That is, the feeder circuit 300 determines, based on the response from the adjacent feeder circuit 306, whether the adjacent feeder circuit 306 has sufficient electrical capacity to provide at least a portion of the desired amount of supplemental electric power to the feeder circuit 300. Continuing with the example above, if the feeder circuit 300 requested 20 amps from the adjacent feeder circuit 304 and the adjacent feeder circuit 304 supplied only 10 amps, then the feeder circuit 300 request the remaining 10 amps from the adjacent feeder circuit 306. If the feeder circuit 300 determines that the adjacent feeder circuit 306 has sufficient electric power (e.g., the remaining 10 amps), in process block 416 the switch 302E may close and the feeder circuit 300 receives the remaining portion of the desired amount of the supplemental electric power from the adjacent feeder circuit 306 and avoids load shedding. It should be noted that the feeder circuit 300 may in some embodiments choose whether to receive the full amount of electric power from the adjacent feeder circuit 304 or only a portion from the adjacent feeder circuit 304 and a remaining portion from one or more other adjacent feeder circuits based on a determined enhanced or optimized solution.

If, in the query block 414, the feeder circuit 300 determines that the adjacent feeder circuit 306 cannot provide the remaining portion of the desired amount of supplemental electric power, then, in process block 418, the feeder circuit 300 may initiate load shedding and cut off power from one or more electrical loads coupled to the feeder circuit 300. In some embodiments, the feeder circuit 300 may restore only one or more particular loads according to defined constraints associated with an improved or optimized solution.

Figure 6:
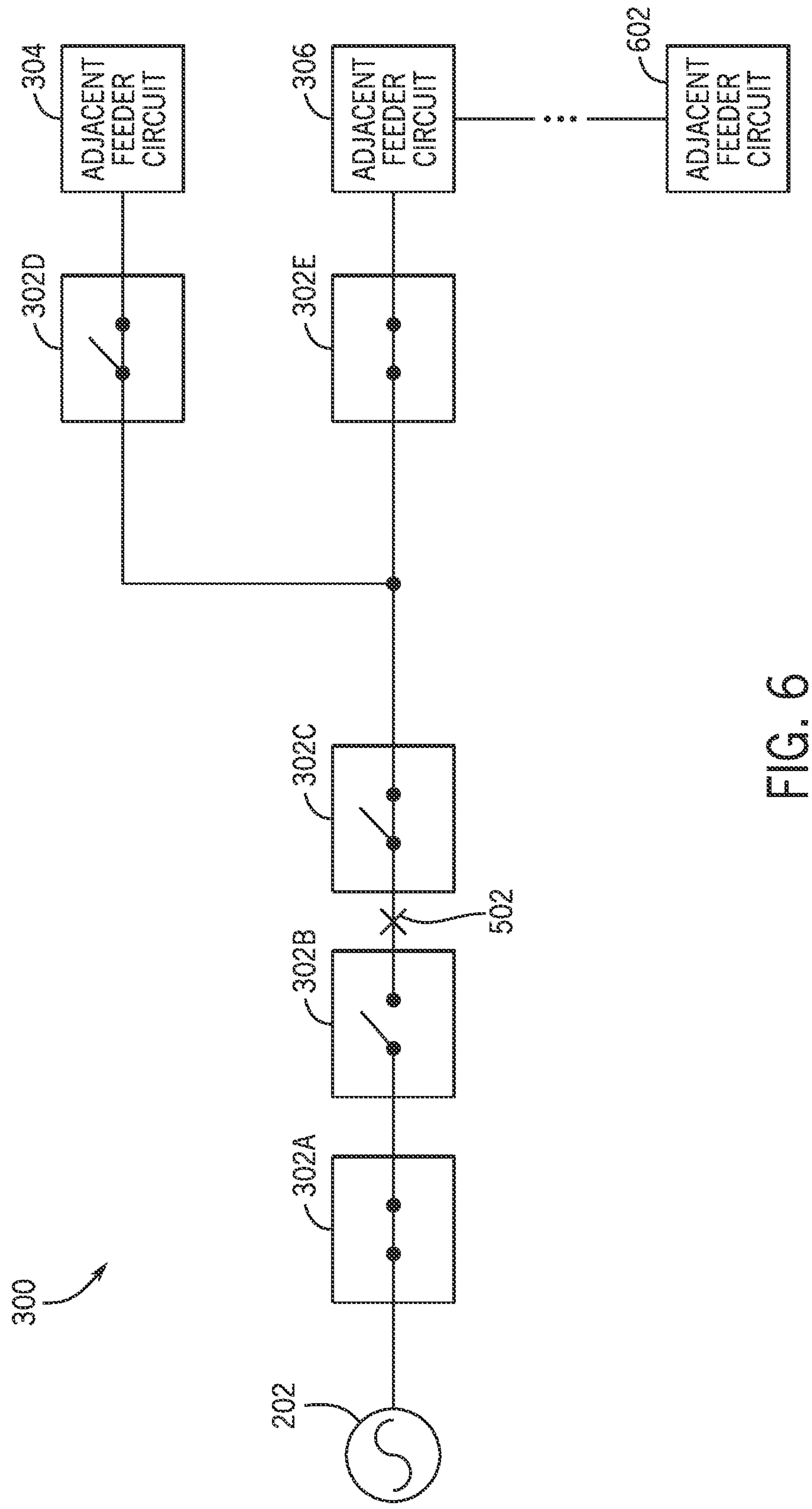
FIG. 6 is a schematic diagram of the feeder circuit of FIG. 3, wherein an adjacent feeder circuit may pull supplemental electric power from another adjacent feeder circuit to provide supplemental electric power to the feeder circuit of FIG. 3, in accordance with an aspect of the present disclosure.
Figure 7:
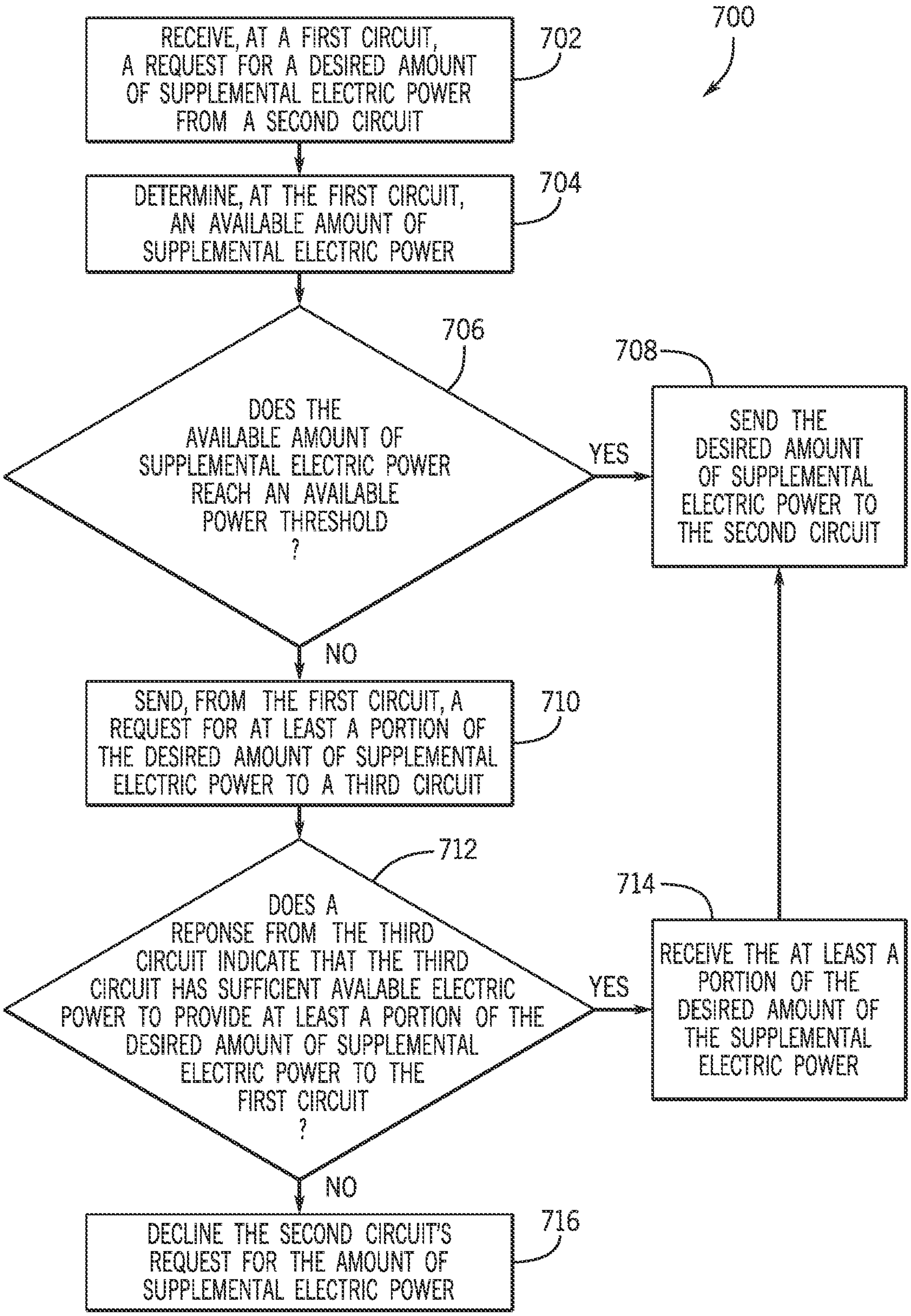
FIG. 7 is a flowchart of a method for requesting, via the adjacent feeder circuit of FIG. 6, supplemental electric power from the other adjacent feeder circuit of FIG. 6, in accordance with an aspect of the present disclosure.

In certain embodiments, if an adjacent feeder circuit is unable to provide supplemental electric power to the feeder circuit 300, the adjacent feeder circuit may itself request supplemental power from yet another adjacent feeder circuit. FIG. 6 is a schematic diagram of the feeder circuit 300 wherein the adjacent feeder circuit 306 may pull supplemental electric power from yet another adjacent feeder circuit 602. FIG. 7 is a flowchart of a method 700 for requesting, via an adjacent feeder circuit (e.g., 306), supplemental electric power from yet another adjacent feeder circuit (e.g., 602). The method 700 may be performed by a processor of a computing device (e.g., the computing device 178) or an IED associated with an adjacent feeder circuit (e.g., 306). More specifically, the method 700 may be performed by a solver, an automation algorithm, or a machine learning engine running on the processor of the computing device or IED associated with the adjacent feeder circuit 306. While the method 700 may be performed by any of the above, the method 700 will be described as being performed by the solver merely for the purpose of simplicity.

In process block 702, the adjacent feeder circuit 306 receives a request for a desired amount of supplemental electric power from the feeder circuit 300. In process block 704, the adjacent feeder circuit 306 determines an available amount of supplemental electric power that the adjacent feeder circuit 306 may supply to the feeder circuit 300. In query block 706 the adjacent feeder circuit 306 may determine whether the available amount of supplemental electric power reaches a threshold level of available supplemental power.

A threshold may be set for various feeder circuits (e.g., the feeder circuit 300, the adjacent feeder circuits 304, 306, and 602) to ensure that a first feeder circuit does not provide excessive electric power to another feeder circuit such that the first feeder circuit risks having insufficient electrical capacity in case of another fault or a sudden increase in demand. For example, if the feeder circuit 300 requests 20 amps from the adjacent feeder circuit 306, the adjacent feeder circuit 306 has exactly 20 amps to spare, and the adjacent feeder circuit 306 provides all 20 amps to the feeder circuit 300, the adjacent feeder circuit 306 may risk being unable to provide sufficient electrical power to one or more loads coupled to the adjacent feeder circuit 306 if demand increases from the one or more loads coupled to the adjacent feeder circuit 306. As such, a certain available power threshold may be set. For example, if an available power threshold of 10 amps is set, the adjacent feeder circuit 306 may only provide the 20 amps to the feeder circuit 300 if the adjacent feeder circuit 306 has 30 amps or more available. Similar considerations may also be made for voltage.

The available power threshold may be set at any appropriate amount as is called for by a particular system. For example, the available power threshold may include 1 amp or more, 2 amps or more, 5 amps or more, 10 amps or more, 50 amps or more, 100 amps or more, and so on. In some embodiments, the threshold level of available supplemental power may be set by the solver based on a number of factors, such as likelihood of a fault occurring on the adjacent feeder circuit 306, the likelihood of additional faults occurring on the electric power delivery system 100, the number and demand of one or more electrical loads coupled to the adjacent feeder circuit 306, real-time system loading, forecasted system loading, weather conditions, and so on. Further, the threshold level of available power may be dynamic, becoming more strict or relaxed based on the state of the adjacent feeder circuit 306 and the state of the electric power delivery system 100. In other embodiments, the threshold level may be user-provided.

If, in the query block 706, the adjacent feeder circuit 306 determines that the available amount of supplemental electric power reaches or exceeds the available power threshold, in process block 708 the adjacent feeder circuit 306 sends the desired amount of supplemental electric power to the feeder circuit 300. In some embodiments, the adjacent feeder circuit 306 may send an indication of the available amount of supplemental electric power to the feeder circuit 300. The feeder circuit 300 may determine whether to accept all of the available amount of supplemental electric power, a portion of the available amount of supplemental electric power, or none of the supplemental electric power, based on a determined improved or optimized solution (e.g., determined by the solver or automation algorithm).

However if, in the query block 706 the adjacent feeder circuit 306 determines that its available amount of supplemental electric power does not reach the available power threshold, in process block 710 the adjacent feeder circuit 306 sends a request for supplemental electric power to another feeder circuit (e.g., 602) adjacent to the adjacent feeder circuit 306. The adjacent feeder circuit 602 may respond to the request by providing how much supplemental electric power the adjacent feeder circuit 602 can send to the adjacent feeder circuit 306.

In the query block 712, the adjacent feeder circuit 306 determines, based on the response from the adjacent feeder circuit 602, whether the adjacent feeder circuit 602 has sufficient electric power to provide at least a portion of the desired amount of supplemental electric power to the adjacent feeder circuit 306. In response to determining that the adjacent feeder circuit 602 has sufficient available electric power to provide the at least a portion of the desired amount of the supplemental electric power, in process block 714, the adjacent feeder circuit 306 receives the at least a portion of the desired amount of the supplemental electric power. The adjacent feeder circuit 306 may then send the amount of supplemental electric power to the feeder circuit 300. However, if, in the query block 712, the adjacent feeder circuit 306 determines, based on the response from the adjacent feeder circuit 602, that the adjacent feeder circuit 602 does not have sufficient available power, the adjacent feeder circuit 306 may, in process block 716, decline the feeder circuit's 300 request for the amount of supplemental electric power.

As previously stated, with the rise of distributed energy resources (DERs), power generators may be quickly and easily added to a grid system (e.g., a distribution subsystem of the electric power delivery system 100) where historically power only originated at a power generator connected to a transmission subsystem of the electric power deliver system 100. With respect to some centralized power models, if a fault occurs in the system the DER asset may be required to electrically isolate itself (i.e., pull itself offline) until the fault is resolved, removing a potentially valuable power source during a fault.

Figure 8:
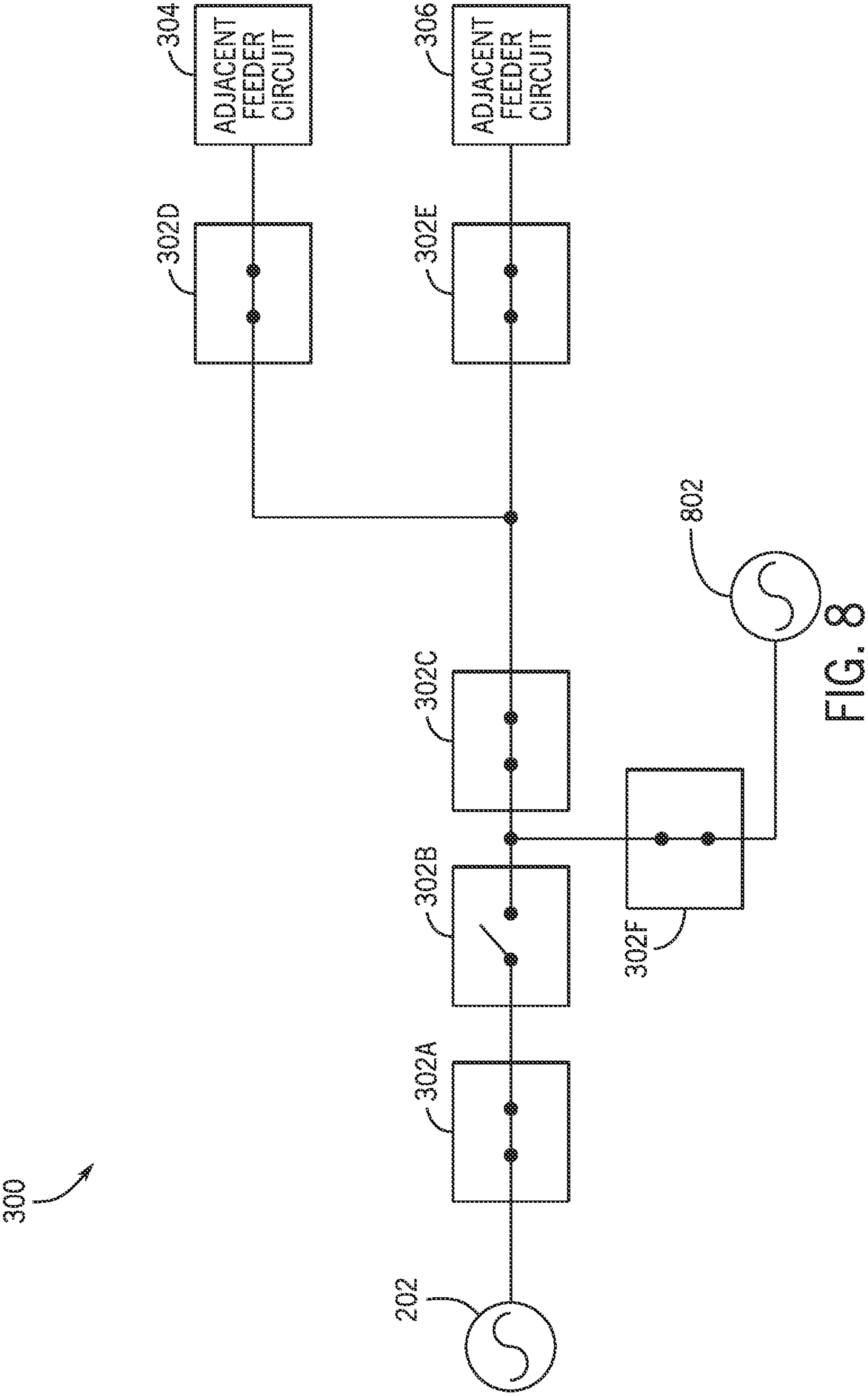
FIG. 8 is a schematic diagram of the feeder circuit of FIG. 3 with an additional DER asset inserted into the path of the feeder circuit, in accordance with an aspect of the present disclosure.

However, as the distributed systems (e.g., the feeder circuit 300) discussed above are smaller in scale with significantly fewer inputs that an entire centralized model (e.g., a model of the entire electric power delivery system 100) DER assets (e.g., one or more solar panels, one or more wind turbines) may be easily added into the models of the distributed systems. FIG. 8 is a schematic diagram of the feeder circuit 300 with an additional DER asset 802 inserted into the path of the feeder circuit 300. The DER asset 802 may be electrically coupled to the feeder circuit 300 via a switch 302F. The solver may be able to more quickly respond to the feeder circuit 300 than if the DER asset 802 were added to the electric power delivery system 100. As such, the distributed system illustrated in FIG. 8 may enable enhanced performance of the solvers, automation algorithms or other control systems with enhanced reliability due to the simplicity of the distributed models.

While specific embodiments and applications of the disclosure have been illustrated and described, it is to be noted that the disclosure is not limited to the precise configurations and devices disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A method, comprising:

determining an electrical fault on a circuit;

determining, via a first intelligent electronic device (IED) associated with the circuit, a first adjacent circuit, wherein the first adjacent circuit is determined via a machine learning engine running on the first IED;

sending a first request via the first IED for a desired amount of supplemental electric power to the first adjacent circuit, wherein the first IED is configured to control one or more components of the circuit;

determining, based on a response received via a second IED associated with the first adjacent circuit and configured to control one or more components of the first adjacent circuit, whether the first adjacent circuit has sufficient electric power to provide the desired amount of supplemental electric power;

in response to determining that the first adjacent circuit has sufficient electric power to provide the desired amount of supplemental electric power, receiving the desired amount of supplemental electric power; and in response to determining that the first adjacent circuit does not have sufficient electric power to provide the desired amount of supplemental electric power, performing a mitigating action to prevent drawing more power than can be supplied.

2. The method of claim 1, wherein performing the mitigating action comprises shedding at least one electrical load electrically coupled to the circuit.

3. The method of claim 1, wherein performing the mitigating action comprises sending a second request for at least a portion of the desired amount of supplemental electric power to a second adjacent circuit.

4. The method of claim 3, comprising, in response to determining that the second adjacent circuit has sufficient electric power to provide the at least a portion of the desired amount of supplemental electric power, receiving the at least a portion of the desired amount of supplemental electric power.

5. The method of claim 3, comprising, in response to determining that the second adjacent circuit does not have sufficient electric power to provide the at least a portion of the desired amount of supplemental electric power, shedding at least one electrical load electrically coupled to the circuit.

6. The method of claim 1, wherein the first adjacent circuit is configured to draw electric power from a distributed energy resource (DER) asset.

7. A non-transitory computer-readable medium comprising instructions, wherein the instructions, when executed by processing circuitry, are configured to cause the processing circuitry to:

receive, via a first intelligent electronic device (IED) associated with a first feeder circuit, a request for a desired amount of supplemental electric power from a second IED associated with a second feeder circuit, wherein the first IED is configured to control one or more components of the first feeder circuit and the second IED is configured to control one or more components of the second feeder circuit, and wherein the first feeder circuit is determined via a machine learning engine running on the second IED;

determine whether an available amount of supplemental electric power at the first feeder circuit satisfies an available power threshold;

in response to determining that the available amount of supplemental electric power at the first feeder circuit satisfies the available power threshold, provide the desired amount of supplemental electric power to the second feeder circuit; and in response to determining that the available amount of supplemental electric power at the first feeder circuit does not satisfy the available power threshold, perform a mitigating action to prevent drawing more power than can be supplied.

8. The non-transitory computer-readable medium of claim 7, wherein performing the mitigating action comprises denying the request for the desired amount of supplemental electric power from the second feeder circuit.

9. The non-transitory computer-readable medium of claim 7, wherein performing the mitigating action comprises sending, from the first feeder circuit, a request for at least a portion of the desired amount of supplemental electric power to a third feeder circuit.

10. The non-transitory computer-readable medium of claim 9, wherein the instructions, when executed by the processing circuitry, are configured to cause the processing circuitry to:

in response to determining that the third feeder circuit has sufficient electric power to provide the at least a portion of the desired amount of supplemental electric power to the first feeder circuit, receive the at least a portion of the desired amount of supplemental electric power; and provide the desired amount of supplemental electric power to the second feeder circuit.

11. The non-transitory computer-readable medium of claim 9, wherein the instructions, when executed by the processing circuitry, are configured to cause the processing circuitry to:

in response to determining that the third feeder circuit does not have sufficient electric power to provide the at least a portion of the desired amount of supplemental electric power to the first feeder circuit, deny the request for the desired amount of supplemental electric power from the second feeder circuit.

12. The non-transitory computer-readable medium of claim 7, wherein the available power threshold is determined by an automation algorithm.

13. The non-transitory computer-readable medium of claim 7, wherein the available power threshold is determined based on a likelihood of a fault occurring on the first feeder circuit, a number of electrical loads coupled to the first feeder circuit, an amount of electrical power demand from the number of electrical loads coupled to the first feeder circuit, or any combination thereof.

14. The non-transitory computer-readable medium of claim 7, wherein the first feeder circuit is configured to draw electric power from a distributed energy resource (DER) asset.

15. A control system comprising:

a power supply system;

a first feeder circuit, wherein the first feeder circuit comprises a first distributed portion of the power supply system;

a second feeder circuit, wherein the second feeder circuit comprises a second distributed portion of the power supply system adjacent to the first feeder circuit;

a first intelligent electronic device (IED) communicatively coupled to the first feeder circuit, wherein the first IED is configured to control one or more components of the first feeder circuit and is configured to:

determine a first electrical fault on the first feeder circuit and, in response to determining the first electrical fault, determine an amount of reduced electric power on the first feeder circuit as a result of the first electrical fault;

in response to determining the amount of reduced electric power on the first feeder circuit as a result of the first electrical fault, determine the second feeder circuit to send a request for a desired amount of electric power to via a machine learning engine running on the first IED, send the request to a second IED for the desired amount of electric power from the second feeder circuit, wherein the second IED is communicatively coupled to the second feeder circuit and is configured to control one or more components of the second feeder circuit and determine a second electrical fault on the second feeder circuit;

determine, based on a response received from the second IED, whether the second feeder circuit has sufficient electric power to provide the desired amount of electric power;

in response to determining that the second feeder circuit has sufficient electric power, receive the desired amount of electric power from the second feeder circuit; and in response to determining that the second feeder circuit does not have sufficient electric power, perform a mitigating action to prevent drawing more power that can be supplied.

16. The control system of claim 15, wherein performing the mitigating action comprises shedding at least a portion of a load coupled the first feeder circuit.

17. The control system of claim 15, wherein performing the mitigating action comprises sending another request for at least a portion of the desired amount of electric power to a distributed energy resource.

18. The control system of claim 15, wherein the first feeder circuit comprises a portion of a transmission subsystem of the power supply system.

19. The control system of claim 15, wherein the first feeder circuit comprises a portion of a distribution subsystem of the power supply system.

20. The control system of claim 15, wherein the second IED comprises a machine learning engine configured to be trained on training data associated only with the first feeder circuit or only with the second feeder circuit.

* * * * *